(12) United States Patent
Even, Jr. et al.

(10) Patent No.: US 6,207,124 B1
(45) Date of Patent: Mar. 27, 2001

(54) LITHIUM INTERCALATION CARBON AND METHOD FOR PRODUCING SAME

(76) Inventors: William R. Even, Jr., 4254 Drake Way, Livermore, CA (US) 94550; Ronald A. Guidotti, 3019 Florida St. NE., Albuquerque, NM (US) 87110

( * ) Notice: Subject to any disclaimer, the term of this patent is extended or adjusted under 35 U.S.C. 154(b) by 0 days.

(21) Appl. No.: 09/239,340

(22) Filed: Jan. 28, 1999

Related U.S. Application Data

(60) Provisional application No. 60/073,310, filed on Jan. 29, 1998.

(51) Int. Cl.[7] .................................................. C01B 31/02
(52) U.S. Cl. ........................................ 423/460; 423/445 R
(58) Field of Search ............................... 423/460, 445 R (56) References Cited

U.S. PATENT DOCUMENTS

| 5,344,726 | 9/1994 | Tanaka et al. | 429/209 |
| 5,451,477 | 9/1995 | Omaru et al. | 429/218 |
| 5,843,393 | 12/1998 | Denton et al. | 423/245.1 |
| 5,853,918 | 12/1998 | Tanno | 429/218 |

*Primary Examiner*—Steven P. Griffin
*Assistant Examiner*—Stuart L. Hendrickson
(74) *Attorney, Agent, or Firm*—Timothy P. Evans (57) ABSTRACT

Disordered carbons were synthesized at 700° C. from methacrylonitrile-divinylbenzene precursors. The disorder, even at the free surface, was confirmed with TEM. These powdered carbons were subjected to rapid surface heating by a pulsed infrared laser (59 MW pulses). While the bulk structure remained essentially unchanged, there was substantial "surface reconstruction" to a depth of 0.25 $\mu$m presumably due to ablation, re-deposition, and "recrystallization" of the surface carbon after heating by the laser. The surface ordering appears similar to the bulk microstructure of carbons isothermally annealed at 2,200° C. (i.e., turbostatic). Improvements were observed in first cycle irreversible loss, rate capability, and coulombic efficiencies of the "reconstructed" carbons, relative to the untreated carbon.

10 Claims, 6 Drawing Sheets

LITHIUM INTERCALATION CARBON AND METHOD FOR PRODUCING SAME

CROSS REFERENCE TO RELATED APPLICATIONS

The present application is related to co-pending provisional application Ser. No. 60/073,310, filed Jan. 29, 1998, entitled LITHIUM INTERCALATION CARBON AND METHOD FOR PRODUCING SAME, from which priority is claimed under 35 USC §119(e).

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

1. Field of the Invention

The present invention relates to an improved carbon for use in electrodes for a non-aqueous electrolyte secondary batteries and other similar energy storage devices. More particularly, it is concerned with an improvement in the electrode which includes an electrode active material being capable of reversibly intercalating and deintercalating lithium.

2. Description of the Prior Art

The present invention is drawn to intercalating carbon materials, generally. For many years manufacturers of batteries, especially high energy density lithium batteries, have searched for an electrode material which would allow them to produce safe, inexpensive, secondary cells having a high cycle life, high rate capability, and high voltage. Very early designs proposed using a material having a layered crystal structure which would allow lithium ions to migrate into and out of the interstices of the crystal lattice. The first of these materials to be successfully commercialized was a cell based on molybdenum disulfide. However, it soon became apparent that this material posed unacceptable safety problems.

Much later, carbons of various configuration were proposed as an alternative. These materials have been widely studied since. U.S. Pat. No. 5,853,918, to Tanno, et al., describes a carbon material composed of a layered structure and a turbostatic structure obtained by graphitizing a coke carbon material. U.S. Pat. No. 5,843,393 to Denton, et al., teaches using an amorphous carbon material as an electrode material in a rechargeable electrochemical cell. U.S. Pat. No. 5,451,477 to Omaru, et al., describes a non-aqueous liquid electrolyte secondary cell which includes an carbon anode comprising graphitic and non-graphitic carbons. Finally, U.S. Pat. No. 5,344,726 to Tanaka, et al., describes a carbon material comprising a crystalline core covered by an amorphous carbon layer. The carbon composite is formed by pyrolytically depositing carbon from an carbon containing carrier gas onto a carbon powder held in a closed vessel.

The use of ordered (crystalline and polycrystalline) carbons and true graphites has dominated production of lithium primary and secondary cells in recent years. However, multi-phase and disordered carbons are currently being investigated due to their observed superior reversible capacities as an active anode material comprising an inter-layer compound of a carbon material and lithium. In these inter-layer compounds, lithium enters into a space between the layers of carbon material during the charging process. Ordered-carbons are known to necessarily impose their structural order onto intercalated lithium due to the migration of the lithium into and between the carbon inter-layers as defined along the c-axis. This limits the overall electrochemical capacity of ordered carbon systems to 372 mAhr/g at standard temperatures and pressures (i.e. $LiC_6$ formation). (The phenomenology and energetics of this interaction are reasonably well understood.)

Disordered (or crystallographically amorphous) carbons, on the other hand, lack the obvious "templating" which occurs in graphite and ordered carbons and have been shown to achieve reversible intercalation capacities in excess of 650 mAhr/g (e.g., on the 20th cycle). These disordered carbons seems to be behaving more like a sponge, picking up lithium irrespective of the influences, or lack of, local microstructural order.

This lack of crystallinity, i.e. disorder, however, can profoundly affect the rate of lithium loss at surface defects or functionalities. In these carbons, losses can vary from between 35% to 100% of the first-cycle reversible capacity due to irreversible electrolyte reduction at the surface of the carbon, as the result of parasitic surface reactions at the above mentioned surface defects, forming a solid-electrolyte interface (SEI), usually in the form alkyl lithium compounds and lithium salts. Similarly, particle microstructure can and does influence both intercalation and deintercalation rate capability of these carbons.

In order to better understand lithium insertion, transport, storage and trapping within the lithium secondary cell, disordered, "hard," carbons derived from polymerized methacrylonitrile ("PMAN")-divinylbenzene, have been uniquely processed to modify the surface microstructure of a large fraction of the disordered carbon powder. In particular, a technique herein identified as "laser-induced surface reconstruction" has been used to transform the surface of a PMAN disordered carbon into a more ordered, turbostatic state (herein defined as a carbon with a high degree of local correlation between adjacent ordered planes, i.e., with respect to Lc stack height, but whose orientational correlation with other similar grouping is low for length scales on the order of 2–3 times Lc). The modification is done because, as stated above, irreversible lithium losses associated with solvent decomposition and SEI formation are generally much lower for ordered carbons, whether turbostatic or fully graphitized.

SUMMARY OF THE INVENTION

It is the object of this invention to provide an improved intercalation carbon which combines the better properties of disordered carbons, such as high capacity, with the low irreversible losses and good rate behavior of a more ordered, crystalline carbon.

It is another object of this invention to provide an electrode comprising said improved intercalation carbon having an improved rate capability.

It is another object of this invention to demonstrate the synergistic performance improvements in lithium secondary cells when a carbon composition which combines the two microstructural polymorphs of ordered (obtained via surface reconstruction) and disordered carbons is used as the anode of the cell described.

Still another object of this invention is the description of a process for modifying the surface morphology of a carbon material by using a laser to both rapidly heat and ablate some the surface of the material, and to re-deposited the ablated material as a recrystallized carbon having short range layered structure and to rapidly recrystallize or anneal more deeply buried material adjacent to the ablated zones.

Yet another object is to provide a carbon material having significantly greater unit electrochemical storage capacity, greater energy density, greater high rate capability, and better cycle life then that achieved by conventional carbons. These objects are achieved by minimizing the surface site defect density associated with amorphous carbons thereby significantly reducing parasitic surface reactions while simultaneously providing expedited lithium ion access into the bulk of the carbon material thereby augmenting the material rate capability.

DETAILED DESCRIPTION OF THE PREFERRED EMBODIMENT

The instant invention is herein described. The following example is one possible approach and those skilled in the art will appreciate that many others are possible.
Synthesis A carbon precursor material was prepared as an inverse emulsion containing a methacrylonitrile/divinylbenzene monomer having a mole ratio of 2.6:1. Polymerization was carried out using a persulfate catalyst and a 16 hour 65° C. cure temperature. The resulting low density foam was then forced air died to remove the water pore former, and comminute the polymer foam to a fine powder having a particle size <400 mesh. The precursor powder was washed with n-propanol, dried, and then oxidatively stabilized in air at about 240° C. for 6 hours and subsequently pyrolyzed under flowing high-purity argon maintained a rate of about 2 L/min. To accomplish what amounted to a low temperature pyrolysis, the carbon sample was heated to about 700° C. at a rate of 2° C./min and was held at this temperature for 5 hours. This low temperature pyrolysis was proposed because it is known that processing these precursor powders in this manner would yield carbons having high irreversible losses during initial charge/discharge cycling and would therefore provide materials which would serve as an excellent test vehicle for observing the effects of subsequent surface reconstruction.

Figure 1A:
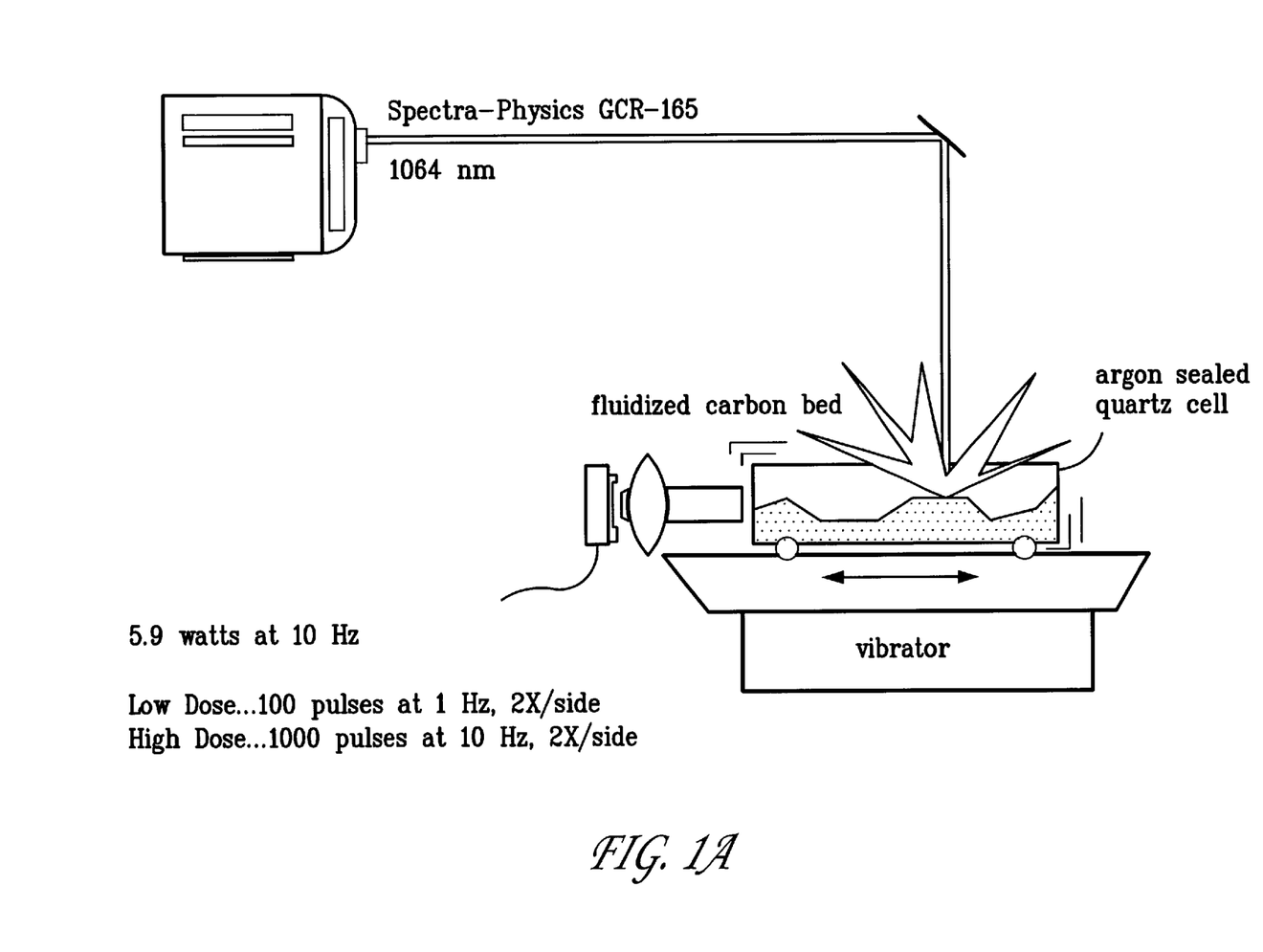
FIGS. 1A & 1B schematically illustrates the apparatus configuration used for laser heating carbon powders: the laser and ancillary optics, the vibatory table used to fluidize the powder bed, and the quartz holding cell used to contain the powder.
Figure 1B:
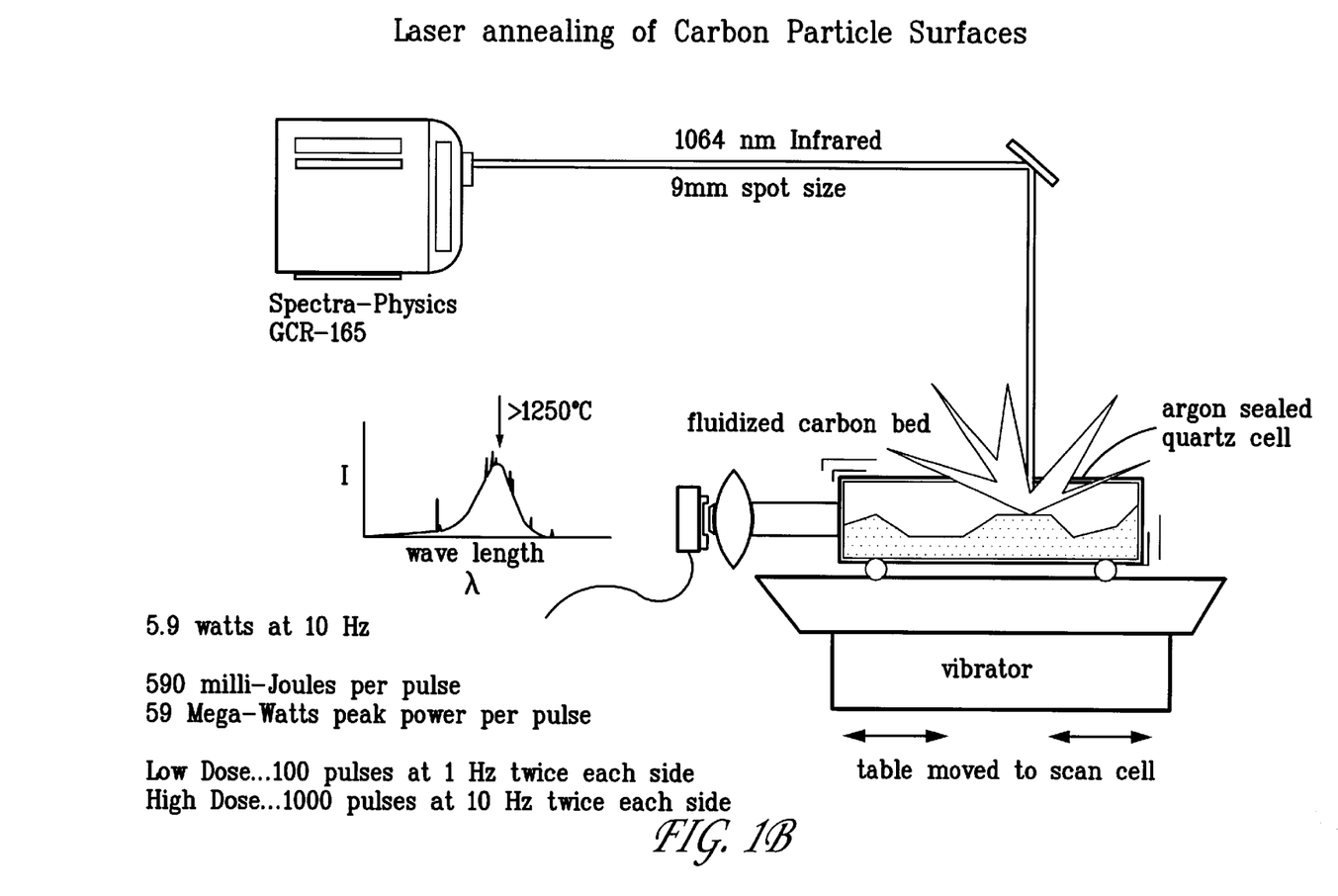

After pyrolysis the powders were cooled and about a 4 gram test sample was repackaged under argon in a sealed quartz cuvette in order to prepare the powder for further processing. The cuvette was attached to a vibratory table via stretched O-rings such that on activation the carbon bed was fluidized. Laser heating or "surface reconstruction" (i.e., ablation and vapor phase re-deposition/recrystallization) was accomplished using a 9-mm-diameter infrared beam operating at a wavelength of 1064 nm emitted by a Spectra-Physics GCR-16S laser; the beam directed orthogonally into the cuvette powder bed. The time averaged power of the laser beam was measured and found to be 5.9 watts when operated at a 10-Hz repetition rate. The cuvette was translated beneath the beam to assure as uniform as possible exposure to the carbon powder contained therein. FIG. 1 illustrates a schematic of the experimental configuration.

Two separate groups of "reconstructed" carbons were prepared from the precursor carbon using this laser technique. These two groups will be referred to hereinafter as "low dose" and as "high dose" carbons. The low dose regime consisted of exposing the cuvette-contained carbon to two sets of 100 pulse of laser light, at a 1 Hz rate, through the top surface of the cuvette, followed by a second two sets of pulses through the bottom surface of the cuvette after flipping that container 180°. The second, or high dose regime, consisted of exposing the carbon to two sets of 1000 (rather than 100) pulses of the laser light, at a 10 Hz rate, again through the top of the cuvette, followed by flipping that container and exposing the carbon to a second two sets of pulses.

Figure 3:
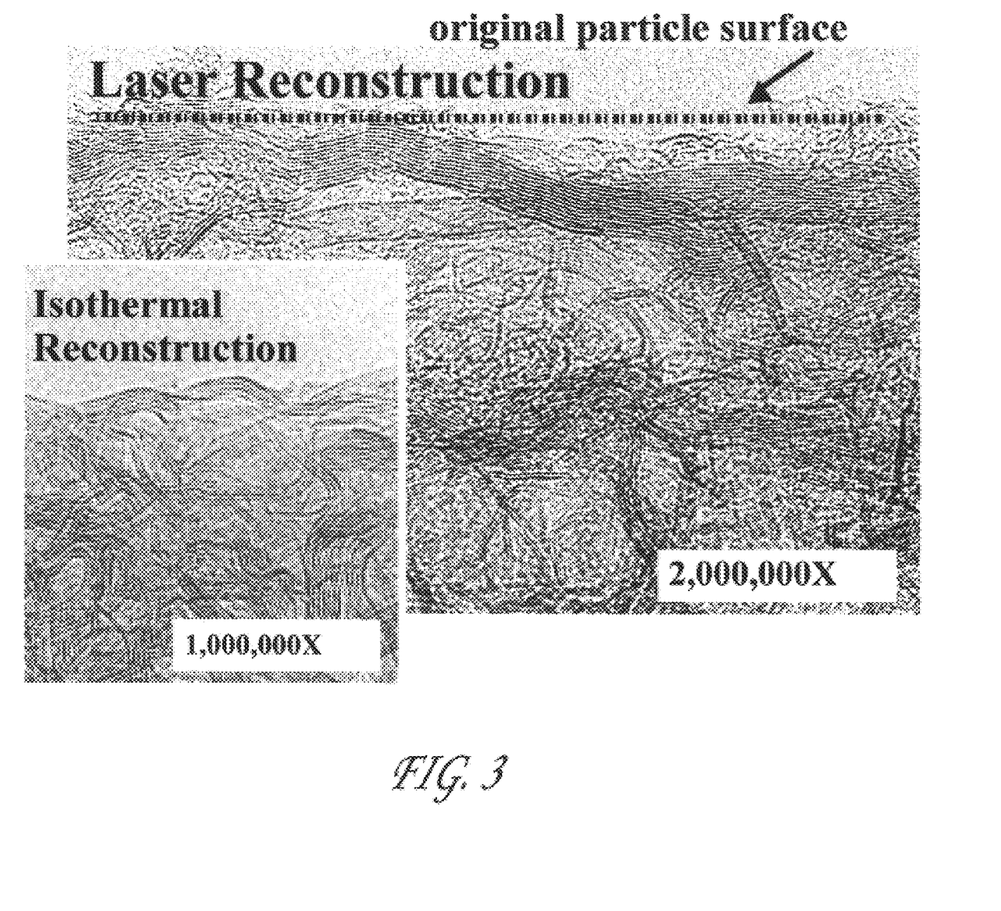
FIG. 3 illustrates typical localized surface ordering as compared to that produced by isothermally annealed carbons.

Because of the extreme surface heating of the carbon, visible light emissions were observed. Carbon material volatilized during processing was clearly visible as a deposit on the inside of the cuvette walls. Measurement of the emitted light yielded a "black-body" temperature of 1,250° C. which was interpreted to be an aggregate lower surface temperature bound. There were also signs of carbon ionization in the emission spectrum, indicating that some of the carbon—either the immediate surface or the material expelled from the surface—experienced significantly higher temperatures. FIG. 3, however, shows that the laser "reconstructed" surfaces are quite similar to bulk structures observed in PMAN carbons which had been subjected to a difficult, long, 2200° C. isothermal processing, suggesting that the treated carbon surfaces actually experienced much higher temperatures comparable to, or exceeding, the isothermal case.

There is no way of assuring that every particle or all surfaces of every particle received laser surface reconstruction. However, the small areal exposure cross-section, the number of repeated pulses, and the randomization associated with the fluidized bed reasonably guarantee a very large fraction of "affected" particles. Other methods for producing the necessary energy deposition may be possible including heating by microwaves or by induction coupling and produce more of an aggregate effect.

Figure 2:
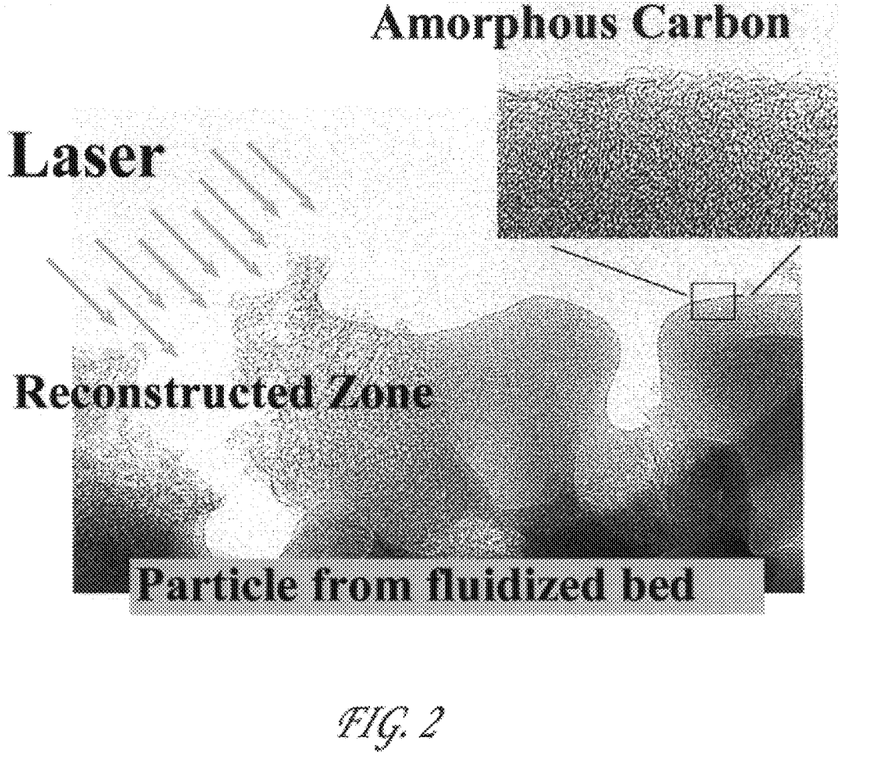
FIG. 2 shows a photomicrograph of a typical area of localized ordering in the PMAN carbon caused by the energy deposition of laser heating.

TEM examination of random samples from the treated powder confirms the large population of treatment particles. FIG. 2 illustrates the surface changes associated with laser contact for a typical carbon particle, ranging from complete disordered bulk structure to a turbostatic surface layer.

Detailed examination of particles, including specimen tilting to maximize alignment with the incident TEM incident beam, reveals substantial reconstruction ordering involving the immediate surface [material potentially associated with SEI layer formation] and the subsurface microstructure [involving intercalation capacity]. See FIG. 3.

Surface area measurements of the "reconstructed" carbons show a decrease in surface area of about 25%. This is consistent with the expected loss of fine surface detail due to volatilization during pulse reconstruction and the deposition of more ordered surface layers.

Physical and Chemical Characterization

The carbon precursor material formed a free flowing powder, which is typical for a low temperature pyrolysis of a nitrogen-containing precursor. The final composition of the example described herein, expressed as weight percentages, was 1.3% H, 3.5% N, 5.7% O, with the balance C.

Under X-ray examination of the precursor material resulted in what appears to be nearly completely disordered structure; exhibiting a single, very broad, x-ray diffraction (XRD) maximum at a two-theta angle equivalent to a $d_{002}$ lattice spacing of 3.75 Å; no other maxima were observed.

Microstructural imaging was carried out via transmission electron microscopy (TEM). Because of the emulsion origin of the carbon powder, no TEM sample preparation was necessary, i.e., the natural meniscus edges provided both sufficiently thin specimen locations for original (virgin) surface identification and examination. A representative image of the post-processed carbon is shown in FIG. 2 and illustrates the disordered nature of these carbons.

Electrochemical Characterization

A three-electrode cells was used to test the "reconstructed" carbons. The test cells were housed in ½" φ Swagelok® perfluoroalkoxy (PFA) "Tee" pipe fittings, whose "legs" had been bored out slightly to accept the cell parts. Carbon electrodes for the cells were prepared by first compounding a carbon paste. This paste consists nominally of a solvent and mixture of 80% of the "reconstructed" carbon, 5% Super 'S' Shawinigan® acetylene black carbon (as a conductive additive), and 15% polyvinylidene difluoride (PVDF) as a binder. It will be recognized that while the use of the conductive additive may be desirable in many circumstances it is not necessary needed and the acetylene black additive may be varied between 0% to as high as 10%. The PVDF binder likewise may be varied depending upon the application. Values between about 5% and 15% may be acceptable.

In the instant invention, dimethylformamide was used as a solvent material. Other solvents are possible including N-methyl-pyrrolidinone.

This paste was spread in a thin layer onto a Cu-foil substrate using a doctor blade apparatus to a thickness of between several thousandths of an inch to a few tens of thousandths depending on the desired capacity. The composite foil electrode was dried and 1.25 cm (0.5" in) diameter discs were then punched from the dried, pasted Cu sheets. The mass of carbon constituting each electrode ranged from between about 5 to 6 mg.

The test cells were assembled in the dry room (RH<3%). Each employed lithium counter and reference electrodes and two Celgard 2500® polypropylene separator discs. Other separator materials are, of course acceptable, including glass mats, papers, and other inert polymeric materials.

Each cell was evacuated and backfilled in a glovebox (<10 ppm $H_2O$ and $O_2$) with 1M $LiPF_6$/ethylene carbonate (EC)-dimethyl carbonate (DMC) (1:1 v/v) which served as the cell electrolyte. The electrolyte typically contained <40 ppm of $H_2O$. Generally, the cells were allowed to stand overnight in order to stabilize the system electrochemistry before being placed on test.

Testing

By way of definition, those skilled in the art of primary and secondary battery technology will understand that when expressing the discharge of a battery in terms of a "C" rate, the writer is describing the approximate time, in hours, over which all or most of the battery electrical capacity is removed. The writer is also, indirectly specifying the electrical load which would be capable of consuming all or most of the battery capacity in a fixed period of time. Therefore, a C/5 rate means that the battery discharge cycle extends for approximately 5 hours under the specified load. Likewise, a C/0.5 (or 2 C) rate would mean discharge in approximately ½ hour.

Each cell was tested galvanostatically between voltage limits of 2 V and 0.01 V vs. $Li/Li^+$. The galvanostatic cycling involved two test regimes: a 32-cycle protocol, followed immediately by an 18-cycle protocol, for a total of 50 cycles for each cell. Two cells were run for each of the plurality of test conditions. Tables I and II lists the protocol: the discharge/recharge rates used and the numbers of cycles to which the cells were subjected at each set of conditions.

TABLE I

Testing Protocol for 32-Cycle Galvanostatic Cycling Between 2 V and 0.01 V.

| Number of Cycles | Intercalation Rate | Deintercalation Rate |
|---|---|---|
| 20 | C/5 | C/5 |
| 3 | C/10 | C/10 |
| 3 | C/2.5 | C/2.5 |
| 3 | C/1.25 | C/1.25 |
| 3 | C/0.625 | C/0.625 |

TABLE II

Testing Protocol for 18-Cycle Galvanostatic Cycling
Between 2 V and 0.01 V.

| Number of Cycles | Intercalation Rate | Deintercalation Rate |
|---|---|---|
| 3 | C/10 | C/10 |
| 3 | C/10 | C/5 |
| 3 | C/10 | C/2.5 |
| 3 | C/10 | C/1.25 |
| 3 | C/10 | C/0.625 |
| 3 | C/10 | C/0.313 |

The aggregate effect of laser surface "reconstruction" on cycling performance is shown in Table III. These data were extracted from the first 20 cycles of the 32-cycle testing where the carbons were intercalated and deintercalated at the same rate (~C/5). This test was then followed by 12 more cycles, three cycles each at deintercalation rates of C/10, C/2.5, C/1.25, and C/0.625, while matching intercalation rate and deintercalation rate. This test technique is familiar to those working in the field of secondary lithium cells.

TABLE III

Summary of Galvanostatic Cycling Tests with Laser-Heated Samples.

| | First Cycle | | | | 20th Cycle | | | |
|---|---|---|---|---|---|---|---|---|
| Treatment | Load mAh/g | Unload mAh/g | Eff. % | Qirr mAh/g-cyc# | Load mAhlg | Unload mAh/g | Eff. % | Fade mAh/g-cyc# |
| Control | 746.3 | 337.3 | 45.2 | 409.0 | 233.6 | 225.2 | 96.4 | −1.94 |
| | [20.5]* | [11.2] | | [9.3] | [2.5] | [2.5] | | [0.31] |
| Low Dose | 779.9 | 354.9 | 45.5 | 425.0 | 252.9 | 245.6 | 97.1 | −1.97 |
| | [12.2] | [11.6] | | [0.6] | [4.7] | [4.2] | | [0.06] |
| High Dose | 641.6 | 326.5 | 50.9 | 315.1 | 242.2 | 228.4 | 94.3 | −1.94 |
| | [35.7] | [22.2] | | [0.6] | [13.5] | [15.3] | | [0.12] |

Fade = (Capacity for Cycle 20 − Capacity for Cycle 11)/10 Cycles.
*Values in brackets are one standard deviation about the mean The purpose of these test regimes is to investigate the effect on cell electrochemical capacity with increasing performance stress, i.e., charge/discharge rate. Each of these data are averages of two cells. Each cell, therefore, was cycled three times at each of the latter four rate conditions following the first twenty cycles. All 32 tests are summarized in FIG. 4.

Table III indicates that there is no significant difference in the first cycle reversible capacities between the carbon samples. Laser heating, however, appears to have substantially increased the first-cycle efficiency for the high-dose sample which resulted in a significant reduction in the first-cycle irreversible loss. This observation is consistent with surface reconstruction invoking a more "graphine," more defect free, and less "disordered" presentation to the electrolyte.

Figure 4:
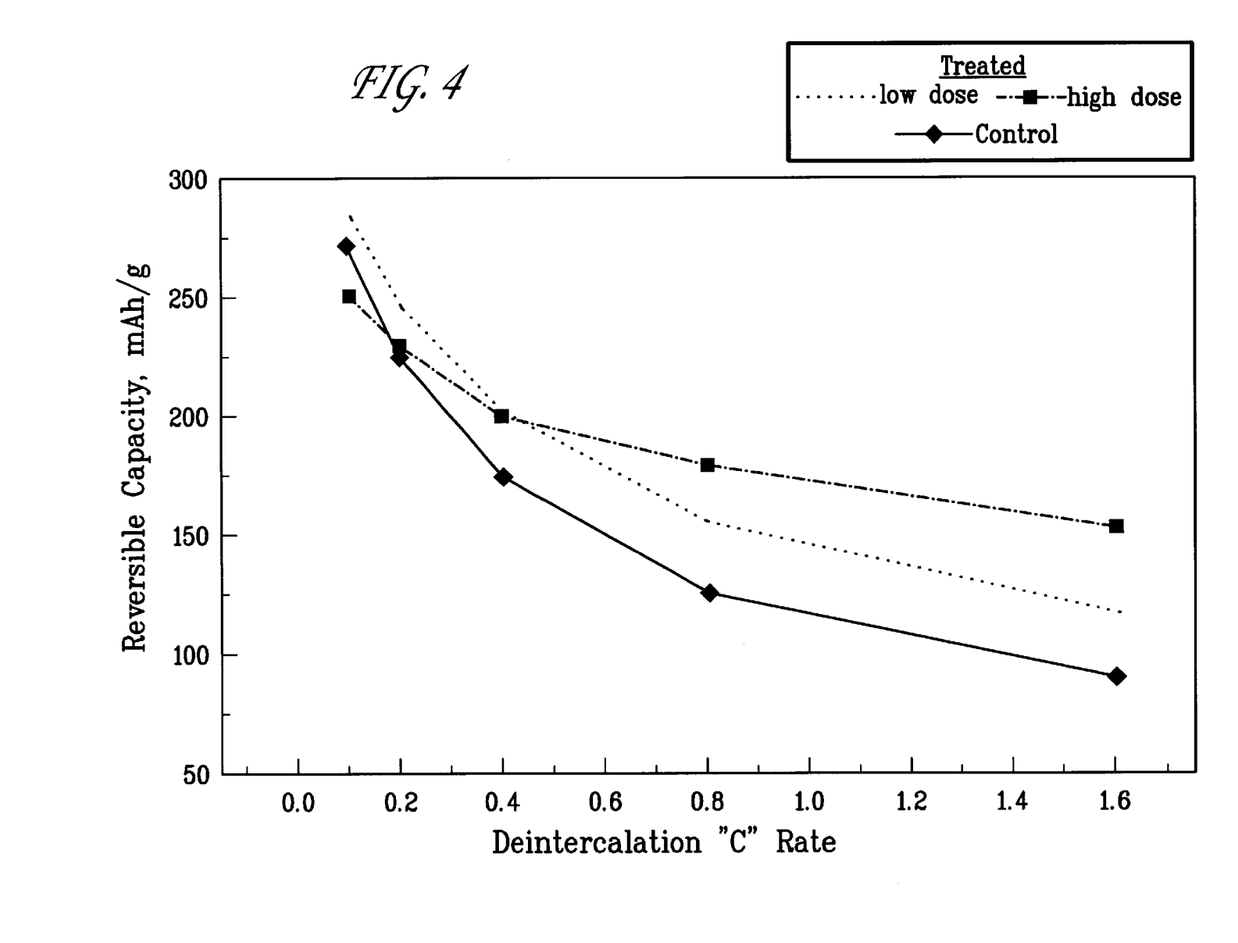
FIG. 4 graphically illustrates the reversible capacities of the test cells tested at five different intercalation/deintercalation rates from C/10 to C/0.625.

The effects of surface "reconstruction" on the reversible capacities of each of the test cells discharged at the C10 and at the 4 higher intercalation/deintercalation rates is summarized in FIG. 4. The low-dose carbon sample showed a greater capacity than the control over the entire range of rates while the high-dose carbon sample was superior to both the control sample and the low-dose sample at charge/discharge rates above 0.4 C.

Figure 5:
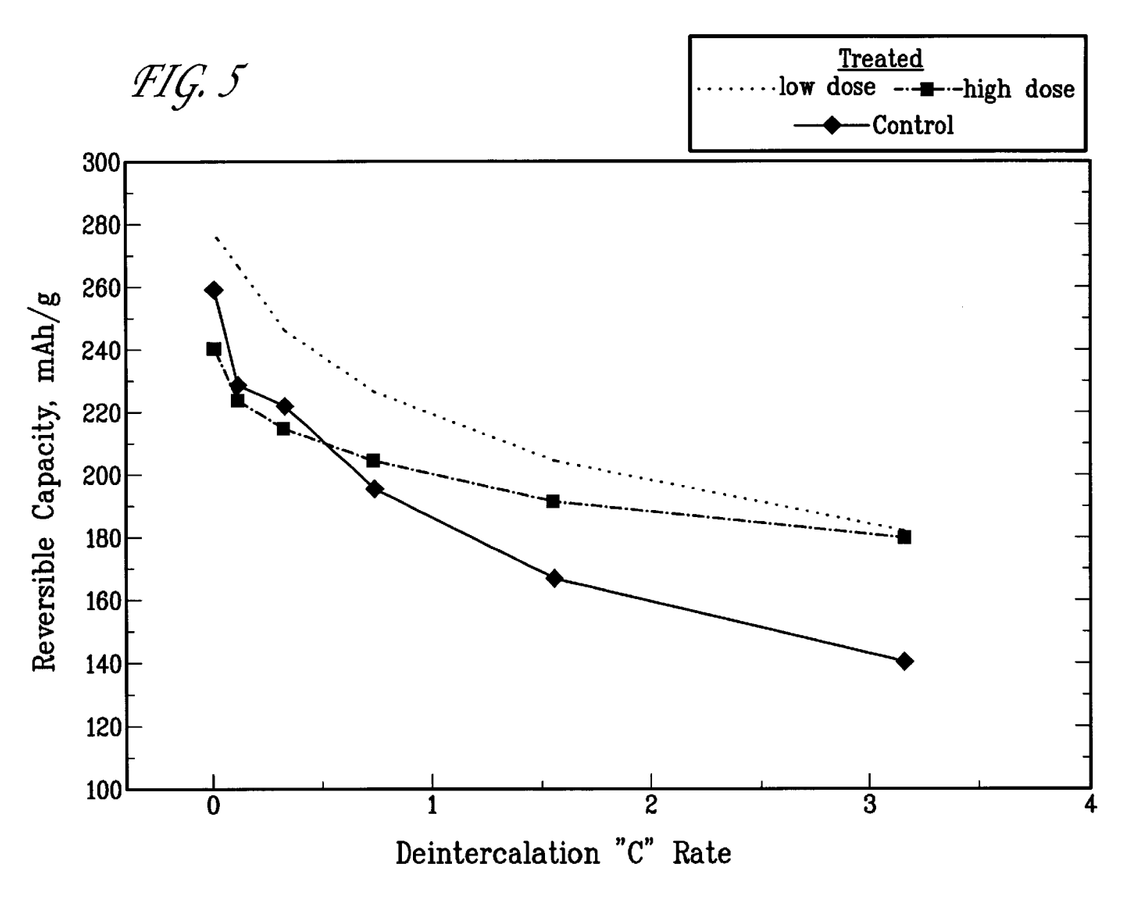
FIG. 5 graphically illustrates the reversible capacities as a function of six different deintercalation rates when the intercalation rate is reduced by 50% to C/10 and held unchanged.

FIG. 5 shows the reversible capacities as a function of rate when the intercalation rate was reduced by 50% to C/10 and held at this constant intercalation rate regardless of deintercalation rate. The deintercalation rates are the same as for FIG. 4, (with the exception that one addition test was performed at a rate of C/0.31). Similar trends were obtained as for FIG. 4, in that laser heat treatment improved the high-rate capability of the carbon. The overall reversible capacities were similar at low rates (below 0.4 C) but were substantially improved at the higher rates. Under these test conditions, the low-dose laser heat treatment was more beneficial than the high-dose heat treatment, however, the conclusion remain the same: laser induced reconstruction improves the high-rate capabilities of this PMAN-derived carbon and likely other disordered carbon systems.

Laser-induced surface reconstruction of PMAN-derived carbons has overall beneficial effects on the performance. Intercalation at the C/10 rate greatly improved the overall performance of the carbon. Some tradeoff between coulombic efficiency and the reversible capacity for the various carbons, can be expected depending on the charge regime used and the power level used during reconstruction. It should be emphasized that these treatment conditions have not optimized and that these data suggest that this technique is applicable to any other type of disordered or polymorphic carbon, such as PAN-derived carbons and MCMB.

What is claimed is:

1. A process for modifying the morphology and crystal structure of an external surface of a plurality of carbon particles, comprising the steps of:

a) providing a carbon powder, said powder comprising carbon particles having an average particle diameter of less than about 40 microns, said carbon particles characterized as having an amorphous structure;

b) surrounding said carbon powder within an inert atmosphere;

c) fluidizing said carbon powder; and d) heating at least a portion of said surface of at least some of said carbon particles, said heating sufficient for causing volatilization and re-deposition of at least some of said particle surface.

2. The process of claim 1, wherein said step of heating includes heating said carbon particles with a laser.

3. The process of claim 2, wherein said laser comprises a pulsed laser.

4. The process of claim 3, wherein said pulsed laser is a pulsed Nd-YAG laser.

5. The process of claim 4, wherein said laser emits radiation at a wavelength of greater than about 1000 nm.

6. The process of claim 4, wherein said laser emits radiation at a wavelength of about 1064 nm.

7. The process of claim 6, wherein said laser providing a beam having a beam spot size of about 9 mm, said beam imputing a time averaged power dose of between about 1.5 watts to about 6.0 watts.

8. The process of claim 7, wherein said laser most preferably provides a beam having a time averaged power dose of at least about 1.6 watts.

9. The process of claim 1, wherein said heating is a radio frequency induction means.

10. The process of claim 9, wherein said radio frequency is a microwave.

\* \* \* \* \*